United States Patent [19]
Horiguchi

[11] Patent Number: 5,903,280
[45] Date of Patent: May 11, 1999

[54] IMAGE DISPLAY APPARATUS THAT REDUCES NECESSARY MEMORY CAPACITY FOR OPERATION

[75] Inventor: Ryuji Horiguchi, Kanagawa, Japan

[73] Assignee: NEC Corporation, Tokyo, Japan

[21] Appl. No.: 08/847,499

[22] Filed: Apr. 25, 1997

[30] Foreign Application Priority Data

May 30, 1996 [JP] Japan .................................. 8-136687

[51] Int. Cl.⁶ ................................................ G06F 15/00
[52] U.S. Cl. ..................... 345/501; 345/507; 345/203; 345/112
[58] Field of Search .................................. 345/418, 419, 345/425, 427, 429, 431, 433, 439, 441–443, 473–475, 112–115, 118, 121–126, 501–505, 522, 523, 524, 507, 186, 510, 188, 509, 515, 191, 196, 197, 203

[56] References Cited

U.S. PATENT DOCUMENTS

| 5,394,516 | 2/1995 | Winser ..................................... 345/419 |
| 5,448,690 | 9/1995 | Shiraishi et al. ......................... 345/433 |
| 5,455,900 | 10/1995 | Shiraishi et al. ......................... 345/441 |
| 5,748,174 | 5/1998 | Wong et al. ............................. 345/118 |

FOREIGN PATENT DOCUMENTS 2-281386  11/1990  Japan .

OTHER PUBLICATIONS

F. Yamaguchi., "Practice of Computer Graphics", Nikkan Kogyou Shinbunsya, The Fourth Chapter: Erasure of Hidden Line and Hidden Planem, (1987), pp. 329–363.

*Primary Examiner*—Ulka Chauhan
*Attorney, Agent, or Firm*—Foley & Lardner

[57] ABSTRACT

An image display apparatus for displaying a plurality of objects in a space using a simplified and efficient structure. The apparatus includes a first storing section having areas for scanning lines, and for each scanning line, has an area that stores the object numbers of the objects having that scanning line as the display start scanning line for the objects. In addition, other sections store a display end scanning line and an object information set for each of the objects. A display end determining section reads the object numbers of the current scanning line, and reads the display end scanning line for the objects of the read object numbers to determine whether the current scanning line is the display end scanning line for these objects. For each such object, if the current scanning line is the display end scanning line for an object, then no operation is performed; while if the current scanning line is not the display end scanning line, then the display end determining section adds the read object number to the area in the first storing section that stores the object numbers of the next scanning line. In addition, a display data generating section generates a display image for the current scanning line, and a display displays the display image.

8 Claims, 6 Drawing Sheets

| SCANNING LINE | OBJECT NUMBER | | | | NUMBER OF OBJECT |
|---|---|---|---|---|---|
| 1 | b11 | b12 | ⋯ | b1n(1) | n(1) |
| 2 | b21 | b22 | ⋯ | b2n(2) | n(2) |
| 3 | b31 | b32 | ⋯ | b3n(3) | n(3) |
| ⋮ | ⋮ | | | | ⋮ |

IMAGE DISPLAY APPARATUS THAT REDUCES NECESSARY MEMORY CAPACITY FOR OPERATION

BACKGROUND OF THE INVENTION

1. Field of the Invention

A present invention relates to an image display apparatus to display a plurality of objects in a space as a 2-dimension image.

2. Description of the Related Art

In computer graphics and so on, when a plurality of objects are displayed on a screen as a 2-dimension image on which shading is performed, the following processes are performed.

(1) Each of the plurality of objects is approximated by polyhedrons. The vertex coordinate of each of the vertexes of each of the polygons that constitute each of the polyhedrons is transformed to a coordinate on a coordinate system of an image space in which a depth coordinate is added to the 2-dimension coordinate of a projection plane. Then, a column (x) address and row (y) address of each vertex on the screen and a coordinate value in a depth direction of the vertex are determined. Also, a brightness value of each vertex of each polygon is determined based on the position of a light source, the viewpoint and so on. Further, information of each of the sides of each polygon is determined from the values of the vertexes of the polygon.

(2) When a scanning line in a row direction intersects with one of the polygons, column addresses and depth values of the intersection points of the scanning line with the polygon and brightness values of the intersection points are determined for every scanning line. A depth value and a brightness value of each of the pixels between the intersection points of each scanning line with the polygon are determined from the above-mentioned values of the intersection points. These determined values are stored in storage areas which are referred to as a Z buffer and an I buffer.

(3) In order to erase a hidden plane in this method, each of determined depth values and the value that is stored in a buffer are compared with each other. If the determined depth value is smaller than the stored value, the values of the Z buffer and the I buffer are rewritten by the determined depth value and brightness.

(4) The above-mentioned processes are executed for each of all the polygons for the objects to be displayed. In this manner, an image is generated and displayed.

In this method of displaying an image, the Z buffer for one screen is necessary in addition to the I buffer for storing the brightness value of each of the pixels on the screen. Also, in this method, many memories are necessary for the X buffer. Further, it is necessary to use a high-speed memory to access the Z buffer at high speed.

Figure 1:
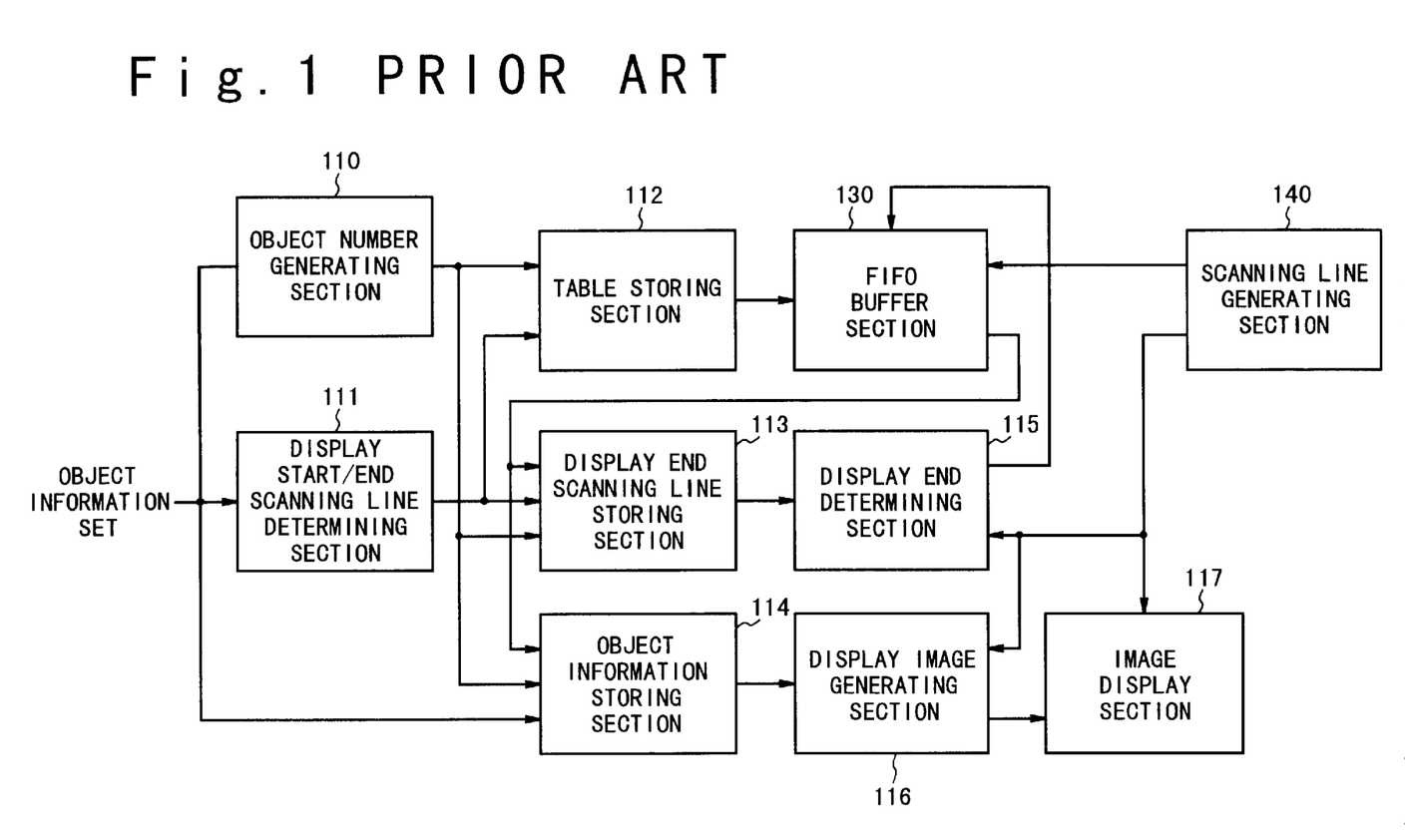
FIG. 1 is a block diagram illustrating the structure of a conventional example of an image display apparatus.

In order to solve these problems, a method is known in which each of the objects is displayed every scanning line of the screen, as shown in Japanese Laid Open Patent Disclosure (JP-A-Heisei 2-281386). FIG. 1 is a block diagram illustrating the structure of the conventional example.

Referring to FIG. 1, in the conventional example of an image display apparatus, an object number is set for every object by an object number generating section 110. Then, an object information set of each of the objects is stored in an object information storing section 114 in correspondence to each object number. On the other hand, when the scanning line is scanned on the screen in order starting from the top line, the scanning line when the object is displayed on the screen for the first time and the scanning line when the display of the object is ended on the screen are determined for every object by a display start/end scanning line determining section 111. These scanning lines are referred to as the display start scanning line and the display end scanning line, respectively. Then, the display end scanning line of each object is stored in a display end scanning line storing section 113 in correspondence to the object number of the object. Also, the object number of the object is stored in a table storing section 112 for every object in correspondence to the scanning line which is the start scanning line for the object. In this manner, the object number of each of the objects can be stored in correspondence to the display start scanning line of the object. A FIFO buffer section 130 in which a plurality of object numbers are stored is initialized to "0".

Next, an image is generated in order from the first scanning line for every scanning line and is displayed. For this purpose, all the object numbers of objects having the first scanning line as the display start scanning line are read out from the table storing section 112 and added to the FIFO buffer section 130. Then, all the object numbers stored in the FIFO buffer section 130 are sequentially outputted one by one, and the following processing is performed to each of the read object numbers.

That is, the object information set corresponding to the outputted object number is outputted from the object information storing section 114. Then, a display image for displaying the object corresponding to the outputted object number on the first scanning line is generated from the object information set by a display information generating section 116. On the other hand, the display end scanning line corresponding to the outputted object number is outputted from the display end scanning line storing section 113. Then, whether or not the display end scanning line for the object is the first scanning line is determined by the display end determining section 115. Thus, the determination of the display end on the object is performed.

At this time, if the current scanning line is not the display end scanning line of the object, the outputted object number is returned to the FIFO buffer section 130. However, when the first scanning line as the current scanning line is determined to be coincident with the display end scanning line, the object number is not returned to the FIFO buffer section 130.

The above processing is performed to all the object numbers stored in the FIFO buffer section 130. The display image on the first scanning line is displayed by an image display section 117.

Next, a display image is generated for the second scanning line and is displayed. The method is substantially the same as with the first scanning line. However, the object numbers of all objects having the second scanning line as the display start scanning line are outputted from the table storing section 112 and are added to the content of the FIFO buffer section 130, which has been formed through the processing with the first scanning line, that is, to the object numbers of the objects which the display of the objects is not ended on the first scanning line but is continued on the second scanning line. Then, as in the first scanning line, all the object numbers are sequentially outputted from the FIFO buffer section 130 one by one, a display image on the second scanning line is generated and the image of the second scanning line is displayed. At the same time, if the display end scanning line of the object for the outputted object number is not the second scanning line, the outputted object number is returned to the FIFO buffer section 130 to form the content of the FIFO buffer section 130 that will be used by the third scanning line.

Thereafter, the same processing as in the second scanning line is repeated to the third scanning line, and subsequent scanning lines and an image of the objects is generated and displayed on the screen.

In the above-mentioned conventional method of displaying objects, there is a problem in that the storing sections must have a large capacity and the control of each of the storing sections is complicated. This is because a large amount of storing sections are required such as the FIFO buffer section 130 for temporarily storing the data read out from the table storing section 112 in addition to the display end scanning line storing section 113, the object information storage section 114, and the table storing section 112. Further, the FIFO buffer section 130 needs the capacity by which all the object numbers for one screen can be stored therein in a worst case scenario.

Also, there is a problem in that processing speed for determining the display information is slow because processing is sequentially performed for every scanning line, and is performed while accessing to the storing sections each time the sequential processing is performed.

SUMMARY OF THE INVENTION

The present invention is made in the light of the above-mentioned circumstances. Therefore, an object of the present invention is to solve these problems and is to provide an image display apparatus in which a required memory capacity can be decreased so that the structure of the apparatus can be simplified and the display processing speed can be made fast.

In order to achieve an aspect of the present invention, an image display apparatus includes a first storing section having areas for scanning lines, for storing an object number of each of the objects to be displayed, in an area for one of the scanning lines corresponding to a display start scanning line of each of the objects, a second storing section for storing a display end scanning line of each of the objects in correspondence to the object number of each of the objects, a third storing section for storing an object information set of each of the objects in correspondence to the object number of each of the objects, a display end determining section for reading the object numbers for a current scanning line from the first storing section while the scanning lines are scanned, reading the display end scanning lines for the read object numbers from the second storing section to determine whether the current scanning line is the display end scanning line for each of the read object numbers, and for executing no operation when it is determined that the current scanning line is the display end scanning line of each of the read object numbers, a display data generating section for reading the object numbers for the current scanning line from the first storing section, for reading the object information set for each of the read object numbers corresponding to the current scanning line from the third storing section, and for generating a display image for the current scanning line from the read object information sets, and a display section for displaying the display image.

Also, the display end determining section adds the read object number to the area of the first storing section for a scanning line next to the current scanning line for display on the next scanning line when it is determined that the current scanning line is not the display end line of each of the read object numbers.

The image display apparatus may further include an object number generating section for generating the object number of each of the objects in response to input of the object information set of each of the objects, and a first determining section for determining the display start scanning line and the display end scanning line of each of the objects from the object information set of each of the objects.

The display end determining section and the display data generating section may operate sequentially or in a parallel manner, respectively.

In order to achieve another aspect of the present invention, an image display apparatus includes a first storing section having areas for scanning lines which are divided into a plurality of scanning line groups with group numbers, for storing an object number of each of the objects to be displayed, in an area for one of the scanning lines corresponding to a display start scanning line of each of the objects, a second storing section for storing a display end scanning line of each of the objects in correspondence to the object number of each of the objects, a third storing section for storing an object information set of each of the objects in correspondence to the object number of each of the objects, a display end determining section for reading the object numbers for a first scanning line of a current scanning line group from the first storing section while the scanning lines are scanned, reading the display end scanning lines for the read object numbers to determine whether the display end scanning line for each of the read object numbers is included in the current scanning line group, a display data generating section for reading the object numbers for the first scanning line of the current scanning line group from the first storing section, for reading the object information set corresponding to the first scanning line of the current scanning line group of the object for each of the read object numbers and the object information set corresponding to a first scanning line of a scanning line group next to the current scanning line group of the object for each of the read object numbers when it is determined that the display end scanning line for each of the read object numbers is not included in the current scanning line group, and for generating a display image for the scanning lines of the current scanning line group from the read object information sets of the object for each of the read object numbers, and a display section for displaying the display image.

When it is determined that the display end scanning line of each of the read object numbers is not included in the current scanning line group, the display end determining section adds the read object number to the area of the first storing section for the first scanning line of the next scanning line group.

The display end determining section determines whether there is included in the current scanning line group the display end scanning line of an object having one of the scanning lines of the current scanning line group other than the first scanning line of the current scanning line group as the display start scanning line, and when it is determined that the display end scanning line of the object is not included in the current scanning line group, the display data generating section reads the object information set corresponding to the display start scanning line of the object and the object information set of the object corresponding to the first scanning line of the next scanning line group and generates a display image for the scanning lines of the current scanning line group from the read object information sets of the object. In this case, the display end determining section adds the read object number to the area of the first storing section for the first scanning line of the next scanning line group when it is determined that the display end scanning line of the object is not included in the current scanning line group.

Also, when it is determined that the display end scanning line of each of the objects for the ones of the read object numbers is included in the current scanning line group, the display data generating section reads the object information sets corresponding to the first scanning line of the current scanning line group of ones of the read object numbers and the object information sets corresponding to the display end scanning lines of the ones of the read object numbers and generates a display image for the scanning lines of the current scanning line group from the read object information sets of the object.

DESCRIPTION OF THE PREFERRED EMBODIMENTS

The image display apparatus of the present invention will be described below in detail with reference to the attached drawings.

Figure 2:
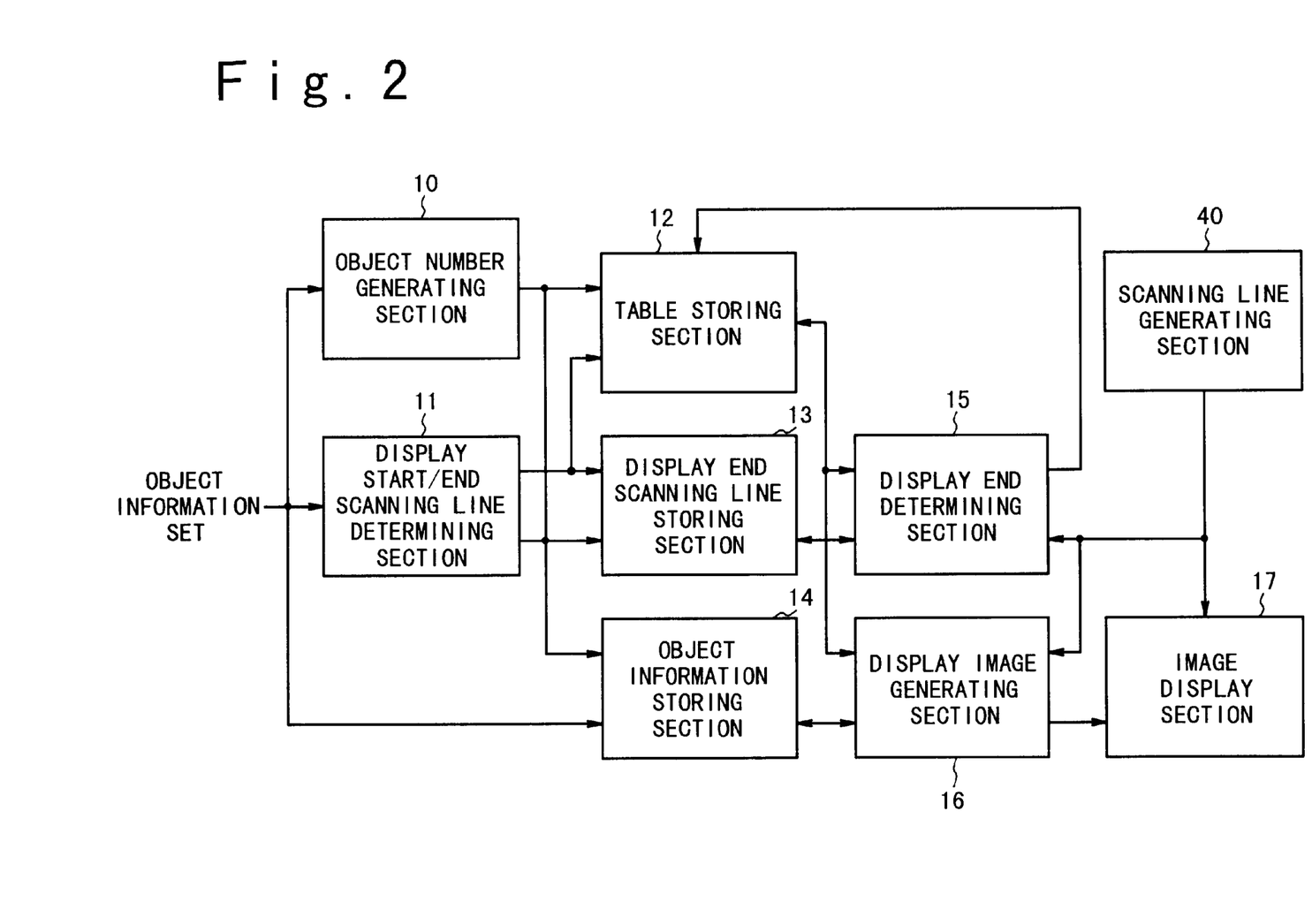
FIG. 2 is a block diagram illustrating the structure of an image display apparatus according to the first embodiment of the present invention.

FIG. 2 is a block diagram illustrating the structure of the image display apparatus according to the first embodiment of the present invention. Referring to FIG. 2, input is an object information set of each of the objects which are expressed in the coordinate form determined based on a screen. That is, when a column direction of the screen is expressed by x, a row direction is expressed by y, and a depth direction is expressed by z, each object is expressed by a relation of x, y and z. The object may be expressed as a free curved surface or by a plurality of polygons.

First, an object number of an object corresponding to the inputted object information set is generated by an object number generating section 10. For example, in order to generate the object number, the object number of the object corresponding to the object information set which has been first inputted is set to "1" and the object number is incremented by "1" as "2", "3", . . . for the object information sets subsequently inputted. The generated object numbers are supplied to a table storing section 12, a display end scanning line storing section 13, and an object information storing section 14. Then, the inputted object information set of the object is stored in the object information storing section 14 in correspondence to the generated object number.

The display start and end scanning line determining section 11 determines a display start scanning line and display end scanning line of the object. The display start scanning line is a scanning line when the object is displayed for the first time when the scanning lines is scanned in order from the top line on the screen. The display end scanning line is a scanning line at which the display of the object ends.

The display start scanning line may be indicated by the minimum value "my" of the object in the direction of y. In this case, because a scanning line is generally indicated by an integer value, a decimal fraction of the minimum value my is rounded up to form an integer, if the minimum value my is not any integer. In this way, the display start scanning line is determined. For example, when the object is expressed by one polygon, the display start scanning line is indicated by the minimum value among the Y values of the vertexes of the polygon. Also, the display end scanning line is indicated by the maximum MY of the object in the direction of y among the Y values of the vertexes of the polygon. When the maximum value MY is not an integer, the decimal fraction of the maximum value MY is rounded down to form an integer. Then, the display end scanning line of the object is stored in the display end scanning line storing section 13 in correspondence to the object number of the object.

Further, the object number of each of the objects corresponding to the object information sets inputted is stored in a table storing section 12 with relation to a scanning line which is the display start scanning line of the object.

Figure 3:
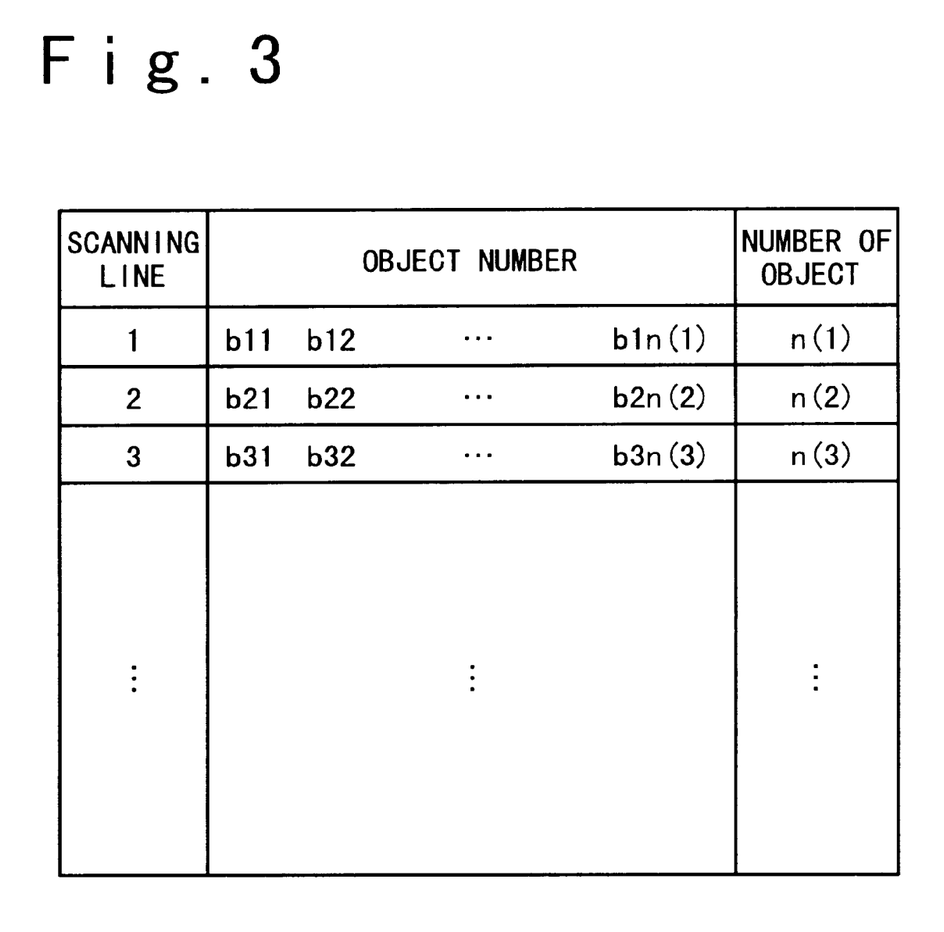
FIG. 3 is a diagram illustrating the content of a table storage section of the image display apparatus in the first embodiment.

FIG. 3 is a diagram to describe the content of the table storing section 12. As shown in FIG. 3, the object numbers are stored in the table storing section 12 in correspondence to the display start scanning line. There is stored in the table storing section 12, for every scanning line, the object numbers of the objects having the scanning line as the display start scanning line and the number of such objects. In the table storing section 12, an area sufficient to write the object numbers and an area for the number of objects to be written are previously prepared for every scanning line. Then, the number of the objects is initialized to "0" for every scanning line. Next, when the object numbers of the objects corresponding to the object information sets inputted are written in the table storing section 12, the following processing is performed for every object. That is, the number n of objects corresponding to the display start scanning line is read. Then, the object number of the object is added to the object number area corresponding to the display start scanning line of the object, and the number of objects corresponding to the object number area is set to n+1. The above processing is performed to all the objects corresponding to the object information inputted. In this manner, the table can be made, as shown in FIG. 3.

Next, an image is generated and displayed in order from the first scanning line of the screen. A scanning line generating section 40 generates the scanning lines for a screen of an image display section 17 and supplies the scanning lines to the table storing section 12, a display end determining section 15, a display image generating section 16, and the image display section 17. The display image generating section reads all the object numbers of the objects which have the first scanning line as the display start scanning line from the table storing section 12. The read object numbers are also supplied to the display end determining section 15. In this case, the number of objects corresponding to the first scanning line is first read out. Then, the object numbers are read out for the number of objects and the following processing is performed every time each of the object numbers is read.

That is, the object information set corresponding to the object number read out from the table storing section 12 is read from the object information storing section 14 to the display image generating section 16. Then, the display information for the object corresponding to the read object number is generated by the display image generating section 16 for the object to be displayed on the first scanning line. For example, when the object is approximated as a polygon, the display information is expressed by an x value, a z value and a brightness value in each of the intersection points of the first scanning line and the sides of the polygon. If the object is approximated by a polygon of a convex shape, the display information may be expressed by an x value, a z value and a brightness value in the left-side intersection point and an x value on the right-side intersection point, a z value when the x value is increased by "1" in the x direction, and an increment of brightness value at that time when the first scanning line intersects the sides of the polygon at the left-side point and the right-side point.

At the same time, it is determined whether or not the object corresponding to the object number read out from table storing section 12 has the first scanning line as the display end scanning line. For this purpose, the display end scanning line corresponding to the read object number is read out from the display end scanning line storing section 13 by the display end determining section 15. Then, the display end scanning line and the first scanning line of the object are compared by the object display end determining section 15 and the end of the display of the object is determined. When the display end scanning line is not coincident with the first scanning line, so that the display of the object is not ended, the object number corresponding to the object is added to the object number area of the table storing section 12 corresponding to the scanning line next to the first scanning line as the current scanning line, i.e., the second scanning line by the display end determining section 15. Then, the number of objects corresponding to the next scanning line is incremented by "1". When the display of the object is to be ended, no processing is performed to the table storing section 12.

The above processing is performed for the number of objects corresponding to the first scanning line. After the display information on the first scanning line is generated, a display image on the first scanning line is generated from the display information by the display information generating section 16. The display image is displayed by the image display section 17. For example, when the object is approximated by a polygon, a z value and a brightness value are generated from the display information for each of the pixels on a segment obtained by projecting the polygon onto the screen. Then, a hiding plane erasure is performed by a z buffer method for every scanning line and the display image on the first scanning line can be generated. Also, after the hiding plane is erased by a scan line method, the display image can be generated by determining a brightness value of each pixel on the first scanning line, like the above-mentioned method. The details of the Z buffer method and scan line method are described in, for example, "Practice of Computer Graphics" by Fujio YAMAGUCHI (Nikkan Kogyou Shinbunsya, the fourth chapter: erasure of hidden line and hidden planem, 1987).

When the image generation processing to a first scanning line is ended in the manner described above, the image generation processing is performed to the second scanning line. The processing to the second scanning line is substantially the same as the processing to the first scanning line. However, the object numbers of the objects which have as the display end scanning line a scanning line other than the first scanning line and whose image is connected to the second scanning line are written in the object number area of the table storing section 12 corresponding to the second scanning line, in addition to the object numbers of objects which have the second scanning line as the display start scanning line. While the object numbers corresponding to the second scanning line is read out, the display information on the second scanning line is generated such that a display image on the scanning line is generated.

At that time, if the display end scanning line of the object corresponding to the read object number is not the second scanning line, the object number corresponding to the object is added to the object number area of the table storing section 12 corresponding to the scanning line next to the current scanning line, i.e., the third scanning line. Then, the number of objects corresponding to the third scanning line is incremented by "1". In this manner, when processing on the second scanning line is ended, the object number of the object which continues to be displayed on the third scanning line has been added to the object number area corresponding to the third scanning line of the table storing section 12.

The same processing that is performed to the second scanning line is performed to the third scanning line and the subsequent scanning lines, and the display image of the whole of the objects is generated and displayed on the screen.

Next, the image display apparatus according to the second embodiment of the present invention will be described.

Figure 4:
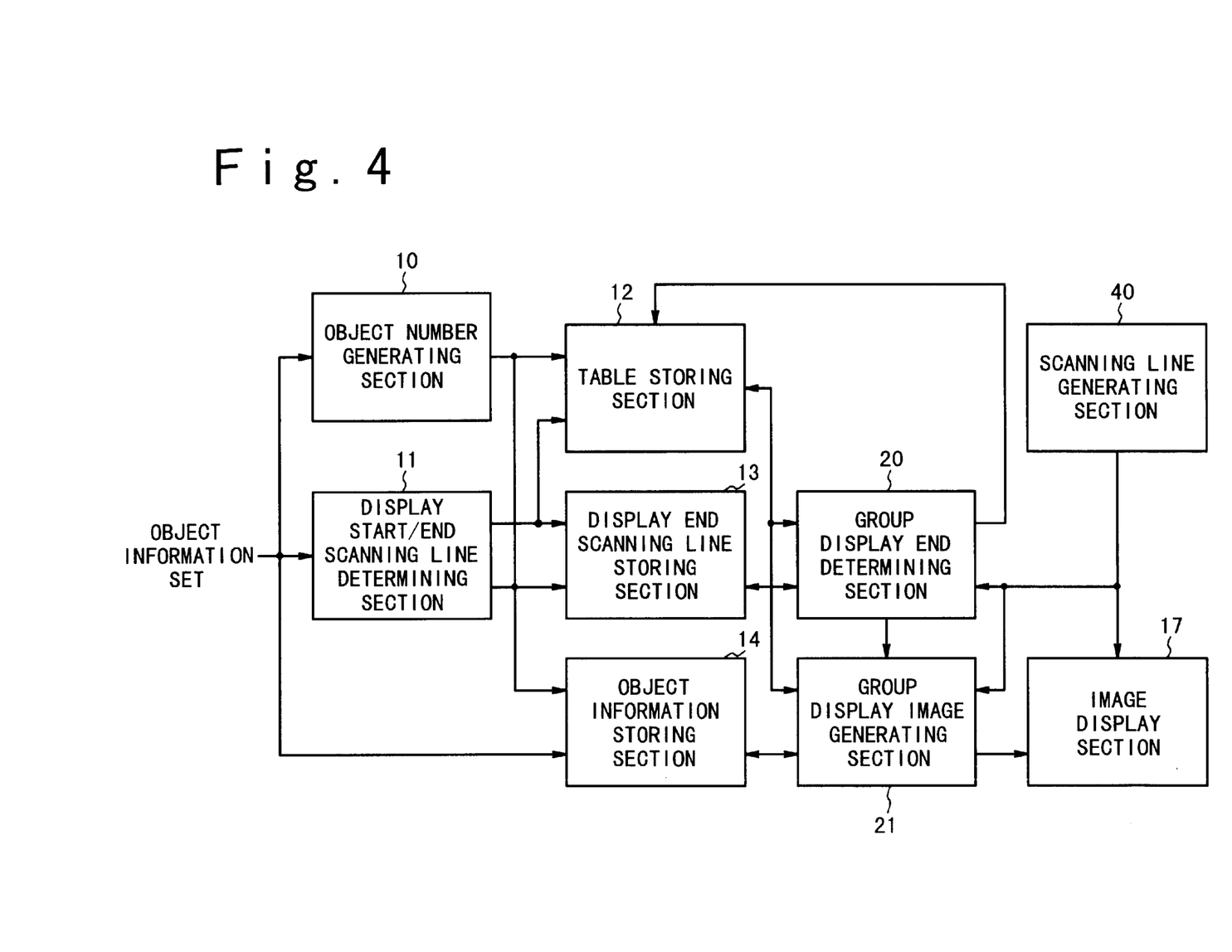
FIG. 4 is a block diagram illustrating the structure of the image display apparatus according to the second embodiment of the present invention.
Figure 5:
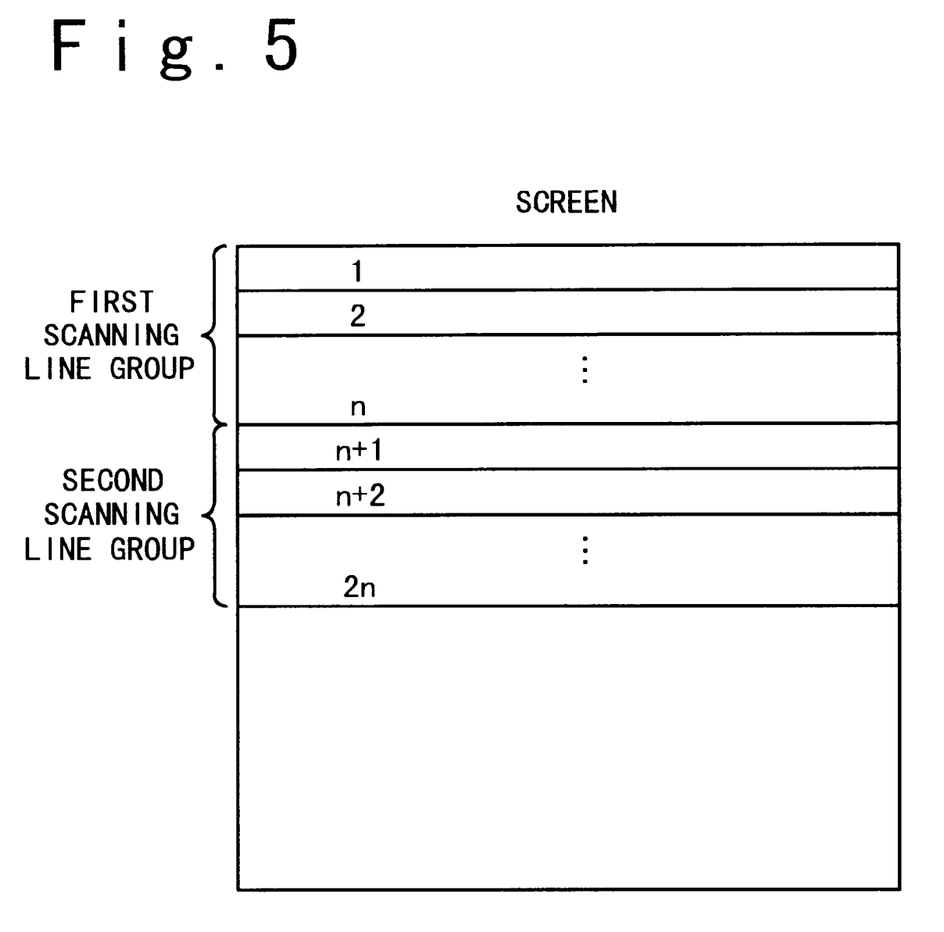
FIG. 5 is a diagram illustrating the scanning line groups used in the image display apparatus in the second embodiment.

FIG. 4 is a block diagram illustrating the structure of the image display apparatus in the second embodiment. The structure is similar to that of the image display apparatus in the first embodiment. Therefore, the description of the same components will be simplified and the different point will be described in detail. FIG. 5 is a diagram illustrating the state in which all the scanning lines on the display screen are divided into a plurality of scanning line groups. As shown in FIG. 5, each of the scanning line groups on the screen contains the adjacent scanning lines of the same number, i.e., n (n=2, 3, . . . ). That is, the first scanning line group is composed of the first to n-th scanning lines, and the second scanning line group is composed of the (n+1)-th scanning line to the (2n)-th scanning line. Note that the number of scanning lines may be different among the scanning line groups.

In FIG. 4, instead of the display end determining section 15 and the display image generating section 16 of FIG. 2, a group display end determining section 20 and a group display image generating section 21 are used. The input is the same as the case of FIG. 2.

First, the inputted object number of the object is generated by the object number generating section 10 in response to the input of the object information set of the object. The object information set of the object is stored in the object information storing section 14 in correspondence to the object number. Also, the display start scanning line and the display end scanning line of the object are determined in the display start and end scanning line determining section 11, as in the first embodiment. Then, the determined display end scanning line is stored in the display end scanning line storing section 13 in correspondence to the object number of the object. Also, as shown in FIG. 3, the object numbers of all the objects are stored in the table storing section 12 in correspondence to the display start scanning lines, respectively.

Next, a display image is generated and displayed from the first scanning line for every scanning line.

In the first scanning line of the first line scanning line group, the object numbers of all objects having the first scanning line as the display start scanning line is read from the table storing section 12 by the group display image generating section 21. In the read method, the number of objects corresponding to the first scanning line is read, and then the following processing is performed each time the object numbers are read out one by one.

Figure 6:
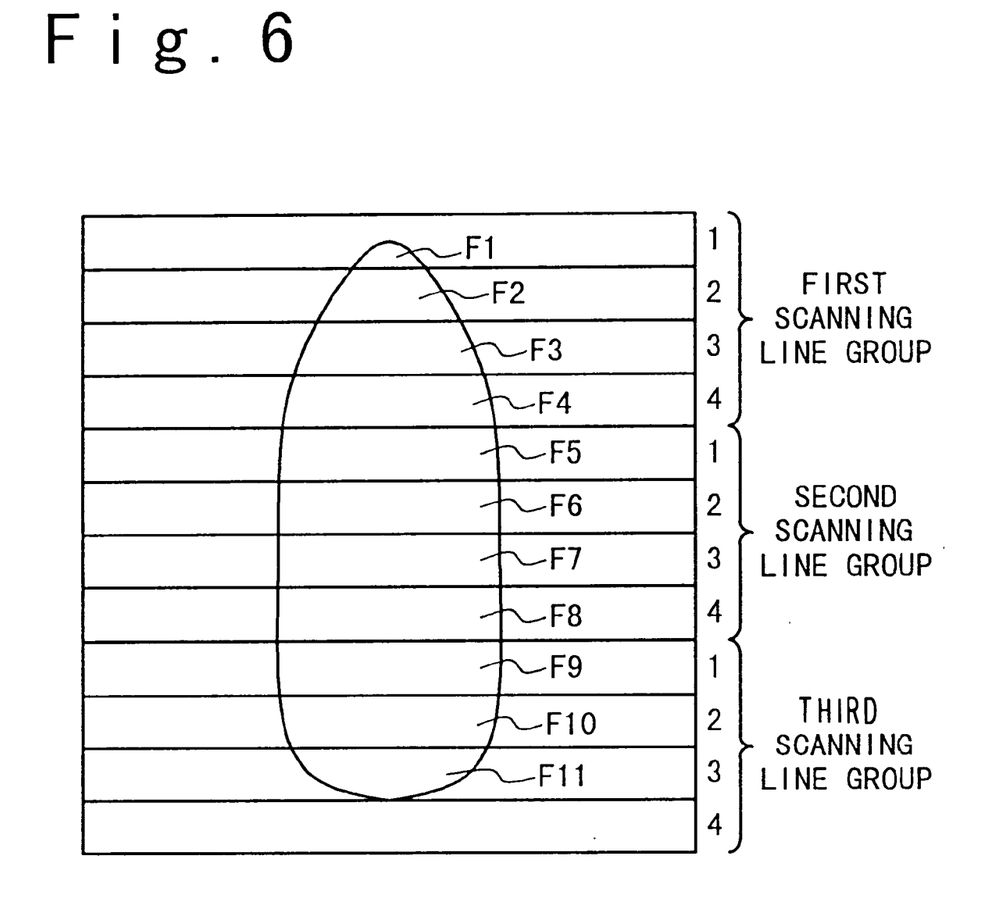
FIG. 6 is a diagram illustrating a display example in the image display apparatus in the second embodiment.

First, the object information set corresponding to the object number that is read out from the table storing section 12 is read from the object information storing section 14. The display information for the first scanning line is generated for the object corresponding to the object number by the group display image generating section 21 to be displayed in the contained scanning line group. For example, when the scanning lines are divided such that each of the scanning line group includes four scanning lines, as shown in FIG. 6, the display images F1 to F4 for the four scanning lines contained in the first scanning line group are generated based on the object information set of the first scanning line of the first scanning line group as a current scanning line group and the object information set of the first scanning line of the second scanning line group as a next scanning line group. In this case, the display image F2 to F4 of the second to fourth scanning lines of the first scanning line group are interpolated based on the display image F1 of the first scanning line of the first scanning line group and the display image F5 of the first scanning line of the second scanning line group.

At the same time, whether or not the display of the object corresponding to the object number that is read from the table storing section 12 is to be ended within the first scanning line group is determined by the group display end determining section 20. For this purpose, the display end scanning line corresponding to the read object number is read from the display end scanning line storing section 13. The scanning line group in which the display end scanning line of the object is contained and the current scanning line group in which the first scanning line is contained are compared by the group display end determining section 20 and whether the display of the object is to be ended is determined based on the result of the comparison. When the scanning line groups are not coincident with each other so that the display of the object, is not ended, this is informed to the group display image generating section 21 and the object number corresponding to the object is added to the area of the table storing section 12 corresponding to the first scanning line of the second scanning line group next to the first scanning line group in which the current first scanning line is contained. Then, the numbers of objects corresponding to the first scanning line of the second scanning line group is incremented by "1".

When the display of the object is to be ended, no processing is performed to the table storing section 12. However, in this case, the group display end determining section 20 informs the display end scanning line of the object corresponding to the read object number to the group display image generating section 21. The group display image generating section 21 generates the display images for the scanning lines from the first scanning line to the display end scanning line based on the object information set of the first scanning line of the first scanning line group and the object information set of the display end scanning line. For example, when the display end scanning line is third scanning line of the third scanning line group as shown in FIG. 6, the display image F10 is generated from the display images F9 and F11.

The above-mentioned processing is performed to each of object numbers of the table storing section 12 corresponding to the first scanning line. Thus, the display information for the scanning line group in which the first scanning line is contained is generated and then a display image is generated from the display information by the group display information generating section 21. The image display section 17 displays the image of the scanning line group.

As described above, after the image generation processing to the first scanning line is ended, the image generation processing to the second scanning line is started. The image generation processing for a second scanning line is approximately the same as that for the first scanning line. However, when the object numbers having the second scanning line of the first scanning line group as the display start scanning line are read out from the table storing section 12, the object numbers are supplied to the group display end determining section 20 and the group display image generating section 21. The group display end determining section 20 determines whether the display end scanning line of the object for each of the read object numbers is contained in the first scanning line group. If the display end scanning line of the object for each of the read object numbers is contained in the first scanning line group, the display end scanning line is informed to the group display image generating section 21, which generates the display image in the manner described above, using the object information set of the display start scanning line and the object information set of the display end scanning line. If the display end scanning line of the object for each of the read object numbers is not contained in the first scanning line group, this is informed to the group display image generating section 21, which generates the display image in the manner described above, using the object information set of the display start scanning line and the object information set of the first scanning line of the next scanning line group.

This processing is performed to each scanning line of the first scanning line group. If the processing to the scanning line of the first scanning line group ends, the same processing is performed to the scanning lines of the next scanning line group. At that time, the object numbers of the objects whose display image extends to the next scanning line group is added to the area of the table storing section 12 corresponding to the first scanning line of the next scanning line group, in addition to the object numbers of the objects having the first the scanning line of the next scanning line group as the display start scanning line. Therefore, the above processing is performed to all the scanning lines, so that the display image is generated and displayed on the screen.

As described above, according to the image display apparatus of the present invention, the hardware structure can be simplified. This is because the buffer memory (FIFO) for temporarily storing the object numbers which are read out from the table storing section can be omitted. In considering the previously-discussed worst case scenario, the buffer memory with the capacity sufficient to store all the object numbers for one screen becomes unnecessary.

Also, the generation of the display information can be made faster. For this purpose, the simple processing is added and the image generation processing is performed in units of scanning line groups. Therefore, the number of accesses to the table storing section can be decreased, resulting in the high-speed operation.

Further, because the buffer memory is omitted, the control of the FIFO buffer section becomes unnecessary. Consequently, the structure of the image display apparatus is simplified.

In addition, when each of the scanning line groups is composed of n adjacent scanning lines, if the above-mentioned interpolation processing for generating the display information for the n scanning lines is performed in parallel in units of scanning lines, the image display can be further made faster.

What is claimed is:

1. An image display apparatus comprising:

a first storing section having areas for scanning lines, for storing a plurality of object numbers corresponding respectively to a plurality of objects to be displayed, wherein for each of said plurality of objects, said corresponding object number is stored in an area for one of the scanning lines corresponding to a display start scanning line of said each object;

a second storing section for storing a display end scanning line of each of said plurality of objects in correspondence to said object number of said each object;

a third storing section for storing an object information set of each of said plurality of objects in correspondence to said object number of said each object;

a display end determining section for reading the object numbers for a current scanning line from said first storing section while the scanning lines are scanned, reading the display end scanning lines for the read object numbers from said second storing section to determine whether the current scanning line is the display end scanning line for each of the read object numbers, and for executing no operation when it is determined that the current scanning line is the display end scanning line of said each read object number;

a display data generating section for reading the object numbers for the current scanning line from said first storing section, for reading said object information set for each of the read object numbers corresponding to the current scanning line from said third storing section, and for generating a display image for the current scanning line from the read object information sets; and a display section for displaying the display image, wherein said display end determining section adds the read object number to the area of said first storing section for a scanning line next to the current scanning line when it is determined that the current scanning line is not the display end line of said read object number.

2. An image display apparatus according to claim 1, wherein said display end determining section sequentially reads the object numbers for the current scanning line from said first storing section while the scanning lines are scanned, reads the display end scanning line for the read object number from said second storing section to determine whether the current scanning line is the display end scanning line for the read object number, adds the read object number to the area of said first storing section for a scanning line next to the current scanning line when it is determined that the current scanning line is not the display end line of said each read object number, and executes no operation when it is determined that the current scanning line is the display end scanning line of said read object number.

3. An image display apparatus according to claim 1, wherein said display data generating section sequentially reads the object numbers for the current scanning line from said first storing section, reads said object information set for the read object number from said third storing section, and generates a display image for the current scanning line from the read object information sets.

4. An image display apparatus according to claim 1, further comprising an object number generating section for generating the corresponding object number of each of said plurality of objects in response to input of the object information set of said each object; and a first determining section for determining the display start scanning line and the display end scanning line of each of said plurality of objects from said object information set of said each object.

5. An image display apparatus comprising:

a first storing section having areas for scanning lines that are divided into a plurality of scanning line groups having group numbers, for storing a plurality of object numbers corresponding respectively to a plurality of objects to be displayed, wherein for each of said plurality of objects, said corresponding object number is stored in an area for one of the scanning lines corresponding to a display start scanning line of said each object;

a second storing section for storing a display end scanning line of each of said plurality of objects in correspondence to said object number of said each object;

a third storing section for storing an object information set of each of said plurality of objects in correspondence to said object number of said each object;

a display end determining section for reading the object numbers for a first scanning line of a current scanning line group from said first storing section while the scanning lines are scanned, reading the display end scanning lines for the read object numbers to determine whether the display end scanning line for each of the read object numbers is included in the current line scanning group;

a display data generating section for reading the object numbers for the first scanning line of the current scanning line group from said first storing section, for reading said object information set corresponding to the first scanning line of the current scanning line group of the object for each of the read object numbers and said object information set corresponding to a first scanning line of a scanning line group next to the current scanning line group of the object for each of the read object numbers when it is determined that the display end scanning line for each of the read object numbers is not included in the current scanning line group, and for generating a display image for the scanning lines of the current scanning line group from said read object information sets of the object for each of the read object numbers; and a display section for displaying the display image, wherein said display end determining section adds the read object number to the area of said first storing section for the first scanning line of the next scanning line group when it is determined that the display end scanning line of said read object number is not included in the current scanning line group.

6. An image display apparatus according to claim 5, wherein said display data generating section reads the object numbers for the first scanning line of the current scanning line group from said first storing section, reads said object information set corresponding to the first scanning line of the current scanning line group of the object for each of the read object numbers and said object information set corresponding to the first scanning line of the next scanning line group of the object for each of the read object numbers when it is determined that the display end scanning line for each of the read object numbers is not included in the current scanning line group, and generates, in a parallel manner, the display image of the scanning lines of the current scanning line group from said read object information sets of the object for each of the read object numbers in units of scanning lines.

7. An image display apparatus according to claim 5, wherein said display end determining section determines whether there is included in the current scanning line group the display end scanning line of an object having one of the scanning lines of the current scanning line group other than the first scanning line of the current scanning line group as the display start scanning line, and wherein said display data generating section reads said object information set corresponding to the display start scanning line of the object and said object information set of the object corresponding to the first scanning line of the next scanning line group when it is determined that the display end scanning line of the object is not included in the current scanning line group, and generates a display image for the scanning lines of the current scanning line group from said read object information sets of the object.

8. An image display apparatus according to claim 7, wherein the display data generating section reads the object information sets corresponding to the first scanning line of the current scanning line group of ones of the read object numbers and the object information sets corresponding to the display end scanning lines of the ones of the read object numbers when it is determined that the display end scanning line of each of objects for the ones of the read object numbers is included in the current scanning line group, and generates a display image for the scanning lines of the current scanning line group from the read object information sets of the object.

* * * * *